UNITED STATES PATENT OFFICE.

ROBERT F. GARDINER, OF CLARENDON, VIRGINIA.

PROCESS OF MAKING A MIXED PHOSPHATIC AND NITROGENOUS FERTILIZER.

1,258,106.   Specification of Letters Patent.   Patented Mar. 5, 1918.

No Drawing.   Application filed August 6, 1917.   Serial No. 184,751.

(DEDICATED TO THE PUBLIC.)

*To all whom it may concern:*

Be it known that I, ROBERT F. GARDINER, a citizen of the United States of America, and an employee of the Department of Agriculture of the said United States, residing at Clarendon, in the county of Alexandria, State of Virginia, (whose post-office address is Clarendon, Virginia,) have invented a new and useful Process of Making a Mixed Phosphatic and Nitrogenous Fertilizer.

This application is made under the act of March 3, 1883, chapter 143 (22 Stat., 625), and the invention herein described and claimed may be used by the Government of the United States or any of its officers or employees in the prosecution of work for the Government, or any person in the United States, without payment to me of any royalty thereon.

My invention relates to the production of di-calcium phosphate, produced by fusing apatite, ground to pass through a sieve of from 60 to 200 mesh, with ammonium sulfate and its dissociation products up to and including the temperature of complete dissociation of ammonium sulfate. By mesh is meant the number of meshes in the sieve employed to the linear inch.

The objects of my invention are:

1. To obtain a phosphatic and nitrogenous fertilizer by direct treatment of suitable phosphorous bearing minerals with a nitrogen carrying salt, namely: ammonium sulfate, and its dissociation products.

2. To provide a comparatively economical means of meeting the soils' immediate plant food needs, as well as providing for its future necessities in a manner similar to that of finely ground phosphate rock.

In practising my process, I take a batch of apatite, ground to 130 mesh or any mesh between 60 and 200, and treat it with suitable proportions of ammonium sulfate at temperatures at or below 150° centigrade, passing through all intermediate temperatures up to and above 400° centigrade in suitable containers, such for example as retorts of various designs modified for intermittent or continuous operation, heated by any desirable method, such for example as waste gases; the gaseous products produced by heating ammonium sulfate are to be absorbed in water or sulfuric acid to partially regenerate ammonium sulfate or other nitrogen sulfur substances, the fused material to be tapped out in a manner similar to a slag, cooled and ground to the desired degree of fineness for the trade.

The advantages of my invention are:

That by means of the reactions which take place both water soluble and two per cent. citric acid soluble compounds are produced, when the ammonium sulfate is fused with apatite ground to 130 mesh or any mesh from 60 to 200.

Two per cent. citric acid soluble phosphates are produced when water is brought in contact with the fusion products of ammonium sulfate and apatite. There is a continuous solubility of the phosphorous containing substances in those minerals until the ammonium acid sulfate, ammonium pyrosulfate and other fusion products of ammonium sulfate are removed from contact with the previously mentioned phosphorous bearing minerals.

The action of the dissociation products of ammonium sulfate on the aforementioned phosphorous bearing minerals takes place with a minimum expenditure of heat energy, inasmuch as the temperature range begins at the fusion temperature of ammonium sulfate and continues up to about 400° centigrade, the dissociation temperature of the fusion products.

The action of the products of dissociation of ammonium sulfate, produced by its fusion up to the complete dissociation temperature have a more pronounced action on the previously mentioned phosphorous bearing minerals, when treated with water, than by a water solution contact of ammonium sulfate and its aqueous dissociation products alone.

The extraction of phosphoric acid ($P_2O_5$) from apatite is more complete when this mineral is previously heated to about 900° centigrade and subsequently fused with ammonium sulfate at about its dissociation temperature.

Under proper physical conditions, any ammonia, sulfur trioxid or sulfur dioxid expelled during the dissociation of the ammonium sulfate may be recovered as ammonium sulfate, sulfites and nitrogen sulfur derivatives or their hydrolytic dissociation products, in any well known way.

Due to the facility of recovering the volatile reaction products expelled with so little expenditure of heat energy and the obtaining of a final fused product which can be so readily prepared for the market, containing both available phosphoric acid ($P_2O_5$) and nitrogen, the invention is essentially an economical one for the production of a good grade of a mixed phosphatic and nitrogenous fertilizer.

Since ammonium sulfate is produced as a by-product of the distillation of coal used for gas works, a by-product of shale oil works, blast furnaces, carbonization of peat and bones, and from calcium cyanamid, the invention might profitably be employed in connection with those industries, provided that the cost of obtaining the raw materials is not prohibitive.

Having thus described my invention, I claim:

1. The process of making phosphatic and nitrogenous fertilizer comprising the fusion of apatite, ground to between 60 and 200 mesh, with ammonium sulfate, the temperature being increased to the dissociation point of the latter.

2. The process of making phosphatic and nitrogenous fertilizer by previously heating apatite, ground to 130 mesh or any mesh between 60 and 200, to about 900° centigrade and then fusing with ammonium sulfate and its dissociation products, thereby rendering more available the phosphoric acid ($P_2O_5$) present in said mineral.

In testimony whereof, I affix my signature in the presence of two subscribing witnesses.

ROBERT F. GARDINER.

Witnesses:
 THOMAS SHAW,
 GEORGE L. HOFFMAN.